Aug. 27, 1968 — R. S. JOHN, JR., ET AL — 3,398,665
LENTICULAR SCREEN AUTOFOCUS SYSTEM
Filed Oct. 24, 1965 — 2 Sheets-Sheet 1

INVENTORS:
Robert S. John, Jr.
Eric K. Maxon.
By Griffin and Branigan
Attys

Aug. 27, 1968   R. S. JOHN, JR., ET AL   3,398,665
LENTICULAR SCREEN AUTOFOCUS SYSTEM
Filed Oct. 24, 1965   2 Sheets-Sheet 2
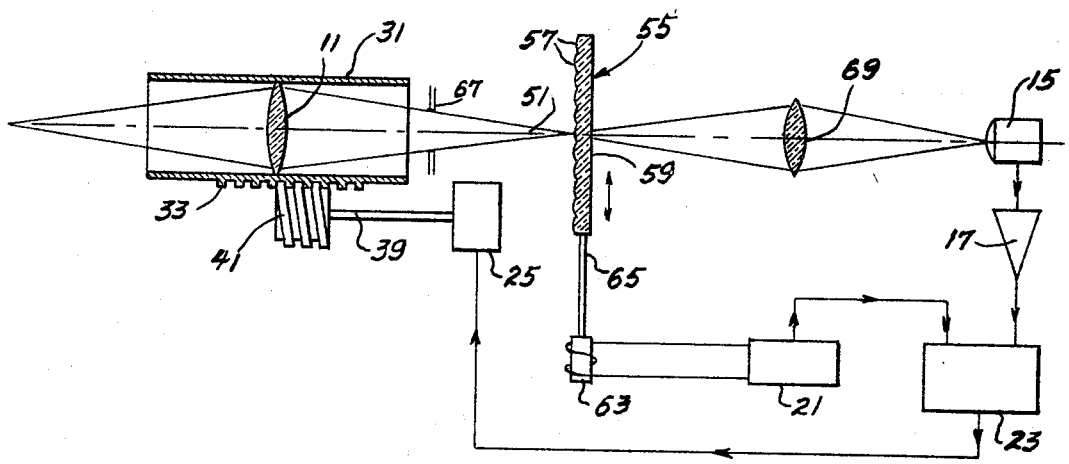
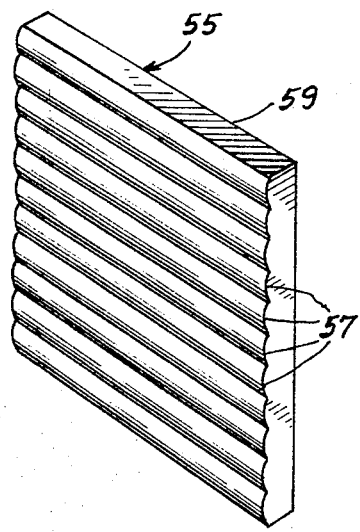 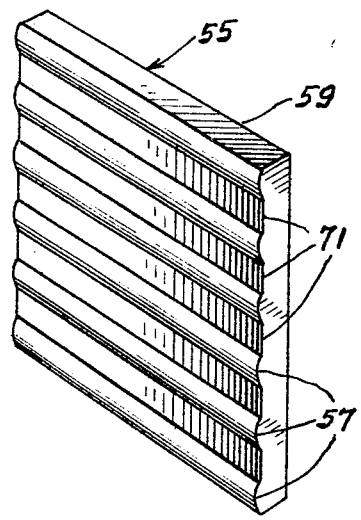
INVENTORS:
Robert S. John, Jr.
Eric K. Maxon.
By Griffin and Branigan
Attys

# United States Patent Office 3,398,665
Patented Aug. 27, 1968

3,398,665
LENTICULAR SCREEN AUTOFOCUS SYSTEM
Robert S. John, Jr., Deerfield, and Eric K. Maxon, Palatine, Ill., assignors to Bell & Howell Company, Chicago, Ill., a corporation of Illinois
Filed Oct. 24, 1965, Ser. No. 504,520
26 Claims. (Cl. 95—45)

ABSTRACT OF THE DISCLOSURE

Disclosed is an automatic range determining apparatus for adjusting the focus of an objective of an optical instrument such as a camera. An imaging lens receives light from a scene and focuses the image onto the surface of a moving lenticular screen. A photocell is positioned to receive light effected by the screen. When the lens focuses the scene image on the face of the screen, intensity variations due to the screen are reduced to a minimum so that the screen is invisible to the photocell and a null signal is generated in the circuit in which the photocell is connected. However, when the lens is not focused on the screen, the screen causes the photocell to see striations. A servo motor, in circuit with the photocell, adjusts the lens to focus the same until a null signal indicates that the lens is focused on the lenticular screen.

---

This invention relates to optical focusing and more particularly to automatic means for continuously maintaining a lens system in focus as the distance between an object and the lens is varied.

In the art of photography, it is essential to have the object being viewed accurately focused upon a light sensitive surface for a perfect reproduction. This has been previously done by a manual adjustment of the distance between the lens and the light sensitive surface as the distance between the object and the lens varies. This requirement for continuous manual adjustment of the lens to maintain focus as the object distance is varied has greatly restricted the use of photographic apparatus. For example, in the past, cameras have been limited because they not only required a focus adjustment prior to taking a picture, but if the object distance varied between the time the adjustment was made and the time the picture was snapped, an out of focus picture resulted. The prior art has recognized this problem and attempted to solve it by various optical, mechanical, and electrical devices. Examples of these devices are set forth in U.S. Patents, 2,618,209; 2,339,780; and 2,838,600. However, these prior art devices have not proven entirely satisfactory. They are generally complex, requiring numerous electromechanical and optical components many of which are specialized. These requirements of complex systems and special components have made these systems expensive and, therefore, unsuitable for wide-spread use in simple photographic apparatus.

The general purpose of this invention is to provide and automatic focusing system which overcomes the disadvantages of the prior art. A principal application of the invention is to cameras and the invention is described in a camera environment. However, it can be used for maintaining the optical focus of other apparatus such as telescopes and microscopes.

An object of the invention is the provision of a new and improved apparatus for maintaining optical focus.

Another object is to provide an apparatus for automatically maintaining the focus of a camera.

Still another object of the invention is the provision of a rugged automatic optical focusing apparatus which utilizes a novel combination of standard electronic, mechanical, and optical components.

A further object of the invention is the provision of a new and improved apparatus for setting optical focus which is simple in construction and operation and adapted for use in a simple camera.

An additional object of the invention is to provide an automatic optical focusing apparatus for continuously determining the direction in which to correct the relative distance between the optics and the image plane to obtain and maintain correct focus.

When used in a camera, the foregoing and other objects of the instant invention are obtained by mounting a photocell along the optical projection axis of an imaging lens which is coupled to the camera's main lens. A lenticular screen is mounted between the imaging lens and the photocell and is adapted to move its lenslets in a plane perpendicular to the image projection axis of the imaging lens. When the focal point of the imaging lens is not located on the face of the lenticular screen, the movement of the lenticular screen causes the photocell to see a moving series of lines or striations and the output of the photocell varies. However, when the focal point of the imaging lens is located on the face of the lenticular screen, the photocell sees a steady image and its output is relatively constant.

A suitable control means is operative in response to a variable output from the photocell to cause the imaging lens to move until its focal point is on the face of the lenticular screen. In this manner, the object's image is maintained in focus on the lenticular screen and the focus of the camera's main lens is maintained by coupling it to the imaging lens so that when the imaging lens is focused on the lenticular screen, the main lens is focused on the camera's film. Hence, the invention provides a simple apparatus for automatically maintaining the focus of a lens system. Moreover, because a telescope, microscope or other optical viewing system can be similarly automatically focused, it will be appreciated that the invention is applicable not only to cameras, but to optical systems in general.

Other objects and many of the attendant advantages of the invention will become apparent by consideration of the following detailed description when considered in conjunction with the accompanying drawings wherein:

FIG. 4 is a partially pictorial and partially schematic diagram of another embodiment of the invention;

FIG. 5 is a pictorial diagram of a lenticular screen used in the embodiment of the invention illustrated in FIG. 4; and FIG. 6 is a pictorial diagram of still another lenticular screen which is suitable for use in the embodiment of the invention illustrated in FIG. 4.

Figure 1:
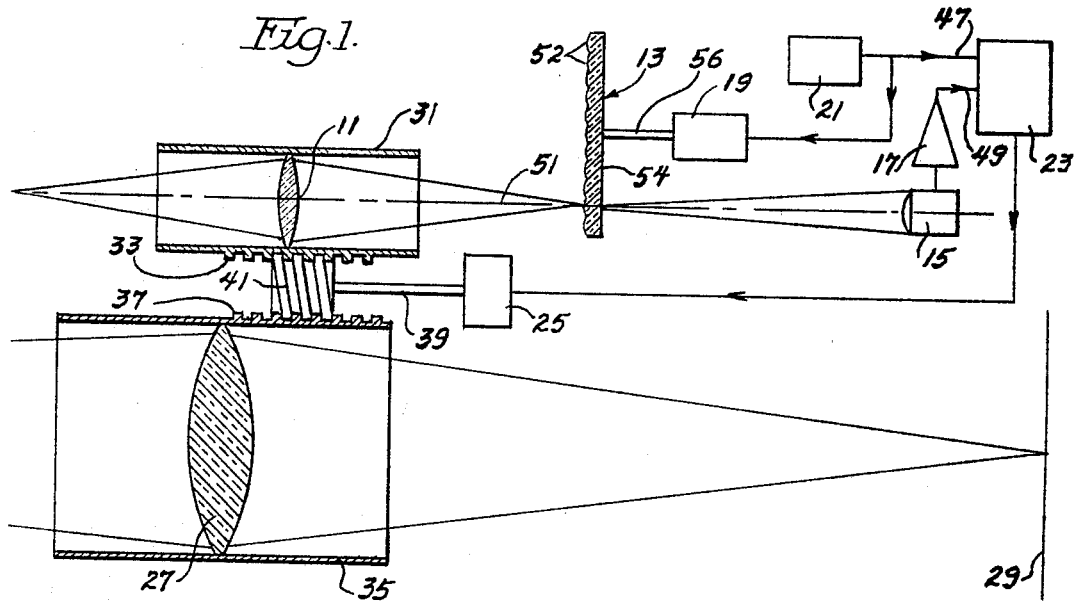
FIG. 1 is a partially pictorial and partially schematic diagram of one embodiment of the invention.

Turning now to a description of the drawings, wherein like reference numerals indicate like parts throughout the several views, FIG. 1 illustrates a preferred form of the invention as it is embodied in a camera. This embodiment includes an imaging lens section, a control section, and a main lens section. The imaging lens section comprises an imaging lens 11, a lenticular screen 13, and a photocell or other light detecting device 15. The control section comprises an amplifier 17, a synchronous motor 19, a signal source 21, a synchronous demodulator 23 and a bi-directional servo motor 25. The main lens section is comprised of a main lens 27 which it is desired to have focused on a photographic film 29.

The imaging lens 11 is mounted on a barrel 31 having a rack 33 fixedly attached thereto. Similarly, the main camera lens 27 is mounted in a barrel 35 to which a rack 37 is affixed. The bidirectional servo motor 25 has a shaft 39 affixed to a worm gear 41 which engages both the imaging lens rack 33 and the main lens rack 37.

The signal source 21 generates a time varying output signal which is delivered to the synchronous motor 19 or other electromechanical transducer means as well as to one input 47 of the synchronous demodulator 23. The output from the photocell 15 is connected, through the amplifier 17, to the second input 49 of the synchronous demodulator 23. The output from the synchronous demodulator is connected to the bidirectional servo motor 25. Such a synchronous demodulator compares the signal from the signal source which powers the synchronous motor and the output signal of the photocell to determine both the amplitude and phase relationship of these signals. For maximum response, the signal frequencies must be equal.

The imaging lens 11 has a projection axis 51 which intersects the lenticular screen 13 as shown. The photocell 15 is mounted on the opposite side of the lenticular screen 13 from the imaging lens and is also intersected by the projection axis 15 of the imaging lens 11. The synchronous motor 19 is connected to the lenticular screen 13 through a shaft 56 which is axially offset from the projection axis.

The lenticular screen (FIGS. 2 and 3) is constructed of a flat transparent material such as plastic and has a plurality of radially tapering semi-cylindrical lenslets 52 on one face 53 thereof, the other face 54 being flat. Broadly speaking, it is these lenslets that cause the photocell 15 to see a series of lines or striations moving across its photosensitive surface when the imaging lens does not have its focal point located on the lenticulated face 53 as the screen is revolved by the synchronous motor 19. As will be subsequently described in more detail, an electronic manipulation of the output from the photocell causes an appropriate movement of the imaging lens 11 to bring its focal point onto the face of the lenticular screen, at which point the system is in focus. Specifically, the signal source 21 generates a time varying output signal which causes the shaft 56 of the synchronous motor 19 to revolve in synchronism therewith. The lenticular screen 13, connected to the shaft 56, also revolves in accordance with the frequency of the signal from source 21.

As the lenslets of the lenticular screen 13 pass through the projection axis of the imaging lens 11, the photocell may see a variable pattern of light. Specifically, the photocell sees a series of lines passing across its photosensitive surface if the imaging lens is not focused on the face of the lenticular screen. Moreover, the variation in illumination in the lines is dependent upon the distance of the imaging lens' focal point from the lenticular screen. That is, the further the focal point is from the screen, the more pronounced is the variation of light across the lines. Hence, the movement of the lines across the surface of the photocell causes it to produce an oscillating output at the frequency of the screen's rotation and having a magnitude that is proportional to the distance of the imaging lens' focal point from the screen.

The amplifier 17 is designed to operate at the synchronizing frequency and amplifies the photocell's oscillating signals. The output from the amplifier is applied to the second input 49 of the synchronous demodulator 23. The output of the synchronous demodulator is proportional to the difference between the magnitude of its two inputs. That is, the output of the demodulator is proportional to the difference in magnitude between the signals from the source 21 and the signals from the amplifier 17. In addition, the polarity of the demodulator's output is dependent upon the phase relationship of its inputs. More specifically, if the input from the signal source 21 leads the input from the amplifier 17, the demodulator's output will have a polarity in one direction. If the input from the signal source 21 lags the input from the amplifier 17, the demodulator's output polarity will be in the opposite direction. Whether the photocell's output leads or lags the signal from the signal source 21 depends upon whether the focal point of the imaging lens 11 is to the left or to the right of the lenticular screen 13 in FIG. 1. For example, if the photographed object moves so as to cause the focal point of the imaging lens 11 to move to the left in FIG. 1, the photocell's output might lead the signal from source 21. If such is the case, the photocell's output would lag the signal from source 21 if the photographed object moved so as to cause the focal point of the imaging lens 11 to move to the right of the lenticular screen.

When the synchronous demodulator 23 generates an output, it causes the shaft 39 of the bidirectional servo motor 25 to revolve in a direction which is dependent upon the polarity of the demodulator's output. As the servo motor shaft 39 is thereby rotated one way or the other, the worm gear 41 causes the racks 33 and 37 to move in a rectilinear manner so as to bring both the focal point of the imaging lens 11 into the plane of the lenticular screen 13 and the image from the main lens 27 into the film 29.

As soon as the focal point of the imaging lens 11 is in the plane of the lenticular screen, the lines cease to appear on the photocell. Hence, the photocell's output is of insufficient amplitude to provide an effective output signal, and represents a "null" position.

As an example of the operation of the above described device assume that it is desired to take a picture of a child. The device may be designed to be capable of automatic focusing at the operator's discretion, such as by pushing a button to energize the device. This type operation is desirable if the operator wants to pre-set the focus by aiming it at the child and turning off the device to hold that focus. However, it may be equally as desirable to have a full time automatic focusing device, such as for moving objects. In such a device, the lens system automatically adjusts itself to place the child in precise focus and maintain that focus even though the child moves. For example, when the child moves, the focal point of the imaging lens 11 moves from the face of the lenticular screen 13 and causes the photocell 15 to see a series of striations. These striations cause the photocell's output to be modulated and the demodulator to cause the bidirectional servo motor's shaft 39 to rotate in a direction so as to bring the focal point of the imaging lens 11 back to the face of the lenticular screen 13. This movement also causes the main lens 27 to be focused on the film 29. Hence, the overall system of the invention is an apparatus for automatically maintaining an object in focus. Moreover, it will be appreciated by those skilled in the art that the foregoing structure is a ruggedly simple device that both avoids the complexities of the prior art and is suitable for use in relatively low cost consumer type of products.

It will also be appreciated by those skilled in the art, however, that the proper operation of the above described structure is dependent upon certain optical design parameters which must be met. Specifically, the angle subtended by the diameter of the imaging lens as seen from the face of the lenticular screen must be greater than the sum of: (1) the ray acceptance angle of each lenslet, that is, the angle subtended by each lenslet as seen from its front focal point; (2) the angle subtended by the photocell's active element as seen from the lenticular screen; and (3) the angle subtended by the object as seen from the forward focal point of the imaging lens. If the foregoing conditions are not met, the photocell 15 may see striations even though the object is in focus whereby the system would be caused to hunt.

It is desirable to be able to have the imaging lens pick out only the field of view of interest. Accordingly, the field of view should be fairly small, preferably in the range of 1 to 2 degrees.

FIG. 4 illustrates an alternative embodiment of the invention which uses a lenticular screen 55 of the type illustrated in FIGS. 5 and 6. Specifically, this type of lenticular screen comprises a plurality of parallel semicylindrical lenslets 57 on one face of a flat transparent material with the opposing face 59 being flat. This embodiment of the invention is in all respects similar to the embodiment of the invention described in connection with FIG. 1 except that the lenticular screen 55 is vibrated perpendicularly in FIG. 4 by the armature 65 of a solenoid 63. In this embodiment, the signal source 21 causes the solenoid and thereby the lenticular screen to vibrate at the frequency of its signals and as in the prior embodiment the signal source 21 also provides a signal to one input of the synchronous demodulator 23.

Except for the operation of the lenticular lens, the operation of the embodiment illustrated in FIG. 4 is substantially the same as that described in connection with FIG. 1 and therefore will not be further discussed. Similarly, although not shown, the FIG. 4 embodiment is adapted to be coupled to a camera's main lens in the same manner as described above. Hence, for purposes of simplicity, this type of coaction will not be reiterated.

FIG. 4 also illustrates two additional components which enhance the operation of the invention but are not critical thereto. Specifically, FIG. 4 includes a mask 67 located between the imaging lens 11 and the lenticular screen 55 to prevent extraneous light from causing an erroneous detecting by the photocell 15. FIG. 4 also includes a schematically illustrated second lens 69 located between the lenticular screen 55 and the photocell 15. This second lens 69 functions, when suitably located along the axis 51, to magnify small lenticular lens striations in order that they may be better detected by the photocell 15.

Figure 2:
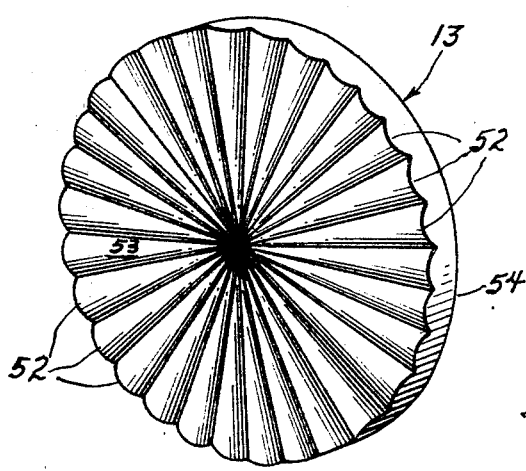
FIG. 2 is a pictorial diagram of a lenticular screen used in the embodiment of the invention illustrated in FIG. 1.
Figure 3:
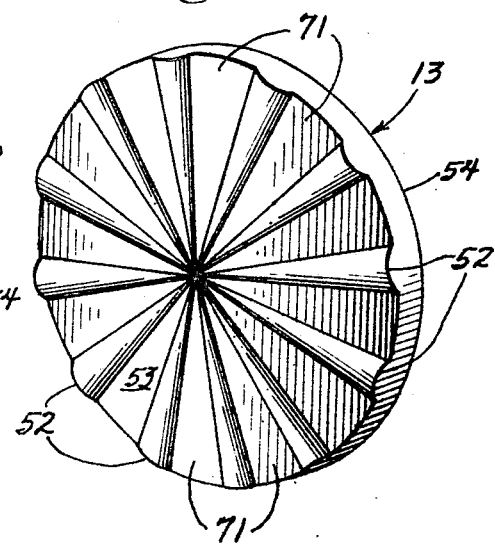
FIG. 3 is a pictorial diagram of another lenticular screen which can be utilized in the embodiment of the invention illustrated in FIG. 1.

The foregoing embodiments of the invention have been described in connection with lenticular screen 13 and 55 as illustrated in FIGS. 2–3 and 5–6, respectively. In FIGS. 2 and 5 the semicylindrical lenslets abut each other. FIGS. 3 and 6 illustrate alternative embodiments of lenticular screens wherein the semicylindrical lenslets are separated by flat spaces 71. The screen of FIG. 3 has been found to operate satisfactorily in the FIG. 1 embodiment of the invention while the screen of FIG. 6 has been found to be satisfactorily operative in the FIG. 4 embodiment. In this connection, it will be appreciated by those skilled in the art that the semicylindrical refractive lenslets have only been illustrated by way of example and that other types of lenslets are also suitable for operation in the invention. Generally speaking, any type of regularly refractive design such as lenslets having triangular or trapezoidal cross sections will be satisfactory. In addition, the invention has been illustrated with the lenslets of the lenticular screen facing the imaging lens. It should be understood, however, that this is just by way of example and that satisfactory operation is also obtained when the lenslets are facing the photocell.

While the foregoing description has illustrated preferred embodiments of the invention that are simple in both operation and construction and are not dependent on special or complex components it should be understood that various other structural modifications are within the invention's scope. For example, the same lens can be used as both the imaging lens and the main lens of an optical system. This is brought about by locating a mirror or prism which may be movable or stationary particularly if semi-reflecting, so as to reflect light from the object onto the lenticular screen. Provision would be made for the removal of the movable reflecting medium prior to photographing through the main optical system. An example of this type of general arrangement is a conventional single lens reflex camera. Similarly, it will be apparent to those skilled in the art that the same lens can be used as both the imaging lens and the main lens by providing for the removal of the lenticular screen and the structure's control portion just prior to the taking of a picture. Consequently, the invention may be practiced otherwise than as specifically disclosed herein.

We claim:
1. Apparatus for automatically maintaining the focus of an optical viewing system comprising:
    lens means, having a projection axis, for detecting light from an object to be focused and focusing said light at a point on said projection axis;
    lenticular screen means positioned to intersect the projection axis of said lens means and movable in a direction perpendicular to said projection axis;
    means for moving said lenticular screen means in a direction perpendicular to said projection axis causing modulation of said rays by said lenticular screen means, said modulation being greater than a minimum when said rays are focused other than on the surface of said lenticular screen means, and being at a minimum when said lens means focuses said rays on said surface of said lenticular screen means; and,
    means responsive to light passing through said lenticular screen means for moving said lens means in a direction to bring its focal point to the face of said lenticular screen means when said focal point is not located at said lenticular screen means, said means responsive to light passing through said lenticular screen means seeing a modulated series of striations when the focal point of said lens means is not focused on the face of said lenticular screen means and seeing a minimum modulation light pattern when said focal point is focused on the face of said lenticular screen means.

2. Apparatus as claimed in claim 1 wherein said system is a photographic camera having further lens means for focusing light from said object in a predetermined plane; and
    means for moving said further lens means in concert with said lens means whereby said object is focused in said predetermined plane when said focal point is located at said lenticular screen.

3. Apparatus as claimed in claim 2 wherein said lenticular screen includes lenslets which produce a variable pattern of light at said light sensing means when said screen is moved perpendicular to said projection axis and the focal point of said lens means is not at said lenticular screen;
    said light responsive means including means for producing an output signal at the frequency at which said screen lenses move in a direction the distance between said focal point and said screen.

4. Apparatus as claimed in claim 1 including an electromechanical transducer means connected to said lens means to move the same parallel with said projection axis and cause said focusing of said light.

5. Apparatus as claimed in claim 1 wherein said means for moving said lenticular screen means is an electromechanical transducer means.

6. Apparatus as in claim 5 wherein said lenticular screen comprises a flat transparent sheet of material having a series of parallel lenslets located on one surface thereof.

7. Apparatus as in claim 5 wherein said lenticular screen means comprises a flat transparent sheet of material having a plurality of radial lenslets located on one surface thereof.

8. Apparatus as claimed in claim 1 wherein said means responsive to light passing through said lenticular screen means includes a light detecting means positioned along the projection axis of said lens means and adapted to intersect the light rays passed by said lens means through said lenticular screen means.

9. Apparatus as claimed in claim 8 wherein said means responsive to light passing through said lenticular screen includes control means having two inputs, one input responsive to the signal energizing said means for moving said lenticular screen, and the second input responsive to the output from said detecting means and generating an output the phase polarity of which is determined by the phase difference between said inputs and the magnitude of which is proportional to the output from said detector means.

10. Apparatus as in claim 9 including:
electro-mechanical transducer means connected to said lens means to move the same parallel with said projection axis and cause said focusing of said light; and,
means connecting said output from said control means to said electro-mechanical transducer means.

11. Apparatus for automatically maintaining the focus of an optical viewing system comprising:
lens means having a projection axis for detecting rays of light from an object to be focused and focusing said rays at a point along said projection axis;
first electro-mechanical transducer means connected to said lens means for moving said lens means parallel to said projection axis;
lenticular screen means positioned to intersect the projection axis of said lens means and adapted for movement perpendicular to said projection axis;
second electro-mechanical transducer means connected to said lenticular screen means to move said lenticular screen means in a direction perpendicular to the projection axis of said lens means causing modulation of said rays by said screen means, said modulation being greater than a minimum when said rays are focused other than on the surface of said lenticular screen means, and being at a minimum when said lens means focuses said rays on said surface of said lenticular screen means;
means generating a signal to energize said second electro-mechanical transducer means;
detection means positioned along the projection axis of said lens means and adapted to intersect the light rays passed by said lens means through said lenticular screen means so as to see a series of striations creating a variable output from said photocell when said rays are not focused on the surface of said lenticular screen means and to see a minimum modulation light pattern when said rays are focused on the surface of the lenticular screen means;
control means having two inputs, one input responsive to the signal energizing said second electro-mechanical transducer means and the second input responsive to the output from said detection means and generating an output the phase polarity of which is determined by the phase difference between said inputs and the magnitude of which is proportional to the output from said detector means; and
means connecting said output from said control means to said first electro-mechanical transducer means whereby said variable output from said detector means causes said control means to generate an output which causes said first electrical transducer means to move said lens means in the direction of focus.

12. Apparatus as claimed in claim 11 wherein said control means comprises a synchronous demodulator.

13. Apparatus as claimed in claim 12 wherein said first electro-mechanical transducer means comprises a bi-directional servomotor having its shaft coupled to said lens means for movement of said lens means along its projection axis.

14. Apparatus as claimed in claim 13 including an amplifier connected between said detection means and said synchronous demodulator, said amplifier adapted to amplify signals at the frequencies generated by movement of said lenticular screen.

15. Apparatus as claimed in claim 14 wherein said lenticular screen comprises a flat transparent sheet of material having a series of parallel lenslets located on one surface thereof.

16. Apparatus as claimed in claim 15 wherein said parallel lenslets are separated by parallel flat sections.

17. Apparatus as claimed in claim 16 wherein said second electro-mechanical transducer means comprises a solenoid, the armature of said solenoid being connected to said lenticular screen means for moving said lenticular screen means in a direction perpendicular to said parallel lenslets.

18. Apparatus as claimed in claim 17 including a second lens means located along the projection axis of said lens means between said lenticular screen and said detection means for reimaging the light rays passed along said projection axis onto said detection means.

19. Apparatus as claimed in claim 18 including a mask located between said lens means and said lenticular screen means and adjacent to said lenticular screen means for limiting the light passing along the projection axis of said lens means and intersecting said lenticular screen means.

20. Apparatus as claimed in claim 19 wherein the surface of said lenticular screen means having said lenslets faces said lens means.

21. Apparatus as claimed in claim 19 wherein the surface of said lenticular screen means having said lenslets faces said detection means.

22. Apparatus as claimed in claim 14 wherein said lenticular screen means comprises a flat transparent sheet of material having a plurality of radial lenslets located on one surface thereof.

23. Apparatus as claimed in claim 22 wherein said radial lenslets are separated by radial flat sections.

24. Apparatus as claimed in claim 23 wherein said second electro-mechanical transducer means comprises a motor adapted for movement of the radial lenslets of said lenticular screen means in a direction perpendicular to said axis of projection of said lens means.

25. Apparatus as claimed in claim 24 including second lens means located along the projection axis of said first lens means between said lenticular screen and said detection means for reimaging the light rays passed along said projection axis onto said detection means.

26. Apparatus as claimed in claim 25 including a mask located between said first lens means and said lenticular screen means and adjacent to said lenticular screen means for limiting the light passing along the projection axis of said lens means and intersecting said lenticular screen means.

References Cited

UNITED STATES PATENTS

| | | | |
|---|---|---|---|
| 595,273 | 12/1897 | Soper. | |
| 2,524,807 | 10/1950 | Kallmann | 95—44 XR |
| 2,848,601 | 8/1958 | Beach | 240—10.6 XR |
| 2,897,722 | 8/1959 | Gunter et al. | 88—56 |
| 2,968,994 | 1/1961 | Shurcliff | 88—56 XR |

NORTON ANSHER, *Primary Examiner.*

G. M. HOFFMAN, *Assistant Examiner.*